US008351381B1

(12) United States Patent
Pawar et al.

(10) Patent No.: US 8,351,381 B1
(45) Date of Patent: Jan. 8, 2013

(54) SYSTEM AND METHOD FOR SWITCHING FROM A FIRST RADIO LINK TO A SECOND RADIO LINK FOR SENDING OR RECEIVING A MESSAGE VIA THE SECOND RADIO LINK

(75) Inventors: Hemanth Balaji Pawar, Herndon, VA (US); Shilpa Kowdley Srinivas, Herndon, VA (US); Anoop K. Goyal, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 651 days.

(21) Appl. No.: 12/350,639

(22) Filed: Jan. 8, 2009

(51) Int. Cl.
*H04W 4/00* (2009.01)
(52) U.S. Cl. ..................... 370/329; 455/452.1
(58) Field of Classification Search .......... None
See application file for complete search history.

(56) References Cited

U.S. PATENT DOCUMENTS

| | | | |
|---|---|---|---|
| 5,970,059 A | 10/1999 | Ahopelto et al. | |
| 5,978,685 A | 11/1999 | Laiho | |
| 6,308,075 B1 | 10/2001 | Irten et al. | |
| 6,463,055 B1 | 10/2002 | Lupien et al. | |
| 6,487,602 B1 | 11/2002 | Thakker | |
| 6,512,926 B1 | 1/2003 | Henry-Labordere | |
| 6,611,516 B1 | 8/2003 | Pirkola et al. | |
| 6,678,524 B1 | 1/2004 | Hansson et al. | |
| 6,714,789 B1 | 3/2004 | Oh et al. | |
| 6,810,262 B2 | 10/2004 | Kim | |
| 6,970,711 B2 | 11/2005 | Mizell et al. | |
| 7,142,879 B2 | 11/2006 | Watanabe et al. | |
| 7,146,636 B2 | 12/2006 | Crosbie | |
| 2006/0087993 A1* | 4/2006 | Sengupta et al. | 370/310 |
| 2006/0104228 A1 | 5/2006 | Zhou et al. | |
| 2006/0168343 A1* | 7/2006 | Ma et al. | 709/245 |
| 2006/0193338 A1 | 8/2006 | Zheng et al. | |
| 2006/0234719 A1 | 10/2006 | Demirhan et al. | |
| 2007/0019584 A1* | 1/2007 | Qi et al. | 370/331 |
| 2007/0274217 A1 | 11/2007 | Long et al. | |
| 2007/0274275 A1* | 11/2007 | Laroia et al. | 370/338 |

(Continued)

FOREIGN PATENT DOCUMENTS

WO WO 2004/019522 A1 3/2004

(Continued)

OTHER PUBLICATIONS

Brian J. Smith, "Cellular Broadband Telemetry Options for the 21st Century," Oct. 23, 2006.

(Continued)

*Primary Examiner* — Jianye Wu

(57) ABSTRACT

A method and system for determining that a given channel defined by a first protocol radio link is overloaded, transmitting a first type of message to a wireless communication device operating on the first protocol radio link, and thereafter transmitting a message of a second type to the wireless communication device via a second protocol radio link. The message of the first type is encoded to cause the wireless communication device to switch from operating on the first protocol radio link to operating on the second protocol radio link and to cause the wireless communication device to switch back to operating on the first protocol radio link upon receipt of the message of the second type. The wireless communication device may present the message of the second type to a user of the wireless communication device.

22 Claims, 5 Drawing Sheets

U.S. PATENT DOCUMENTS

2007/0275719 A1     11/2007    Lee et al.
2008/0268882 A1     10/2008    Moloney

FOREIGN PATENT DOCUMENTS

WO     WO 2006/121832 A1     11/2006

OTHER PUBLICATIONS

Finn Trosby, "SMS, the Strange Duckling of GSM," Telektronikk Mar. 2004, pp. 187-194.

"Introduction to SMS," downloaded from the World Wide Web at http://www.gsmfavorites.com/documents/sms/introduction on Dec. 4, 2008.

"Enhanced Messaging Service," downloaded from the World Wide Web at http://searchmobilecomputing.techtarget.com/sDefinition/0,,sid40_gci785459,00.html on Dec. 10, 2008.

Puneet Gupta, "Short Message Service: What, How and Where?" downloaded from the World Wide Web http://www.wirelessdevnet.com/channels/sms/features/sms.html on Dec. 10, 2008.

Tom Clements, "SMS—Short but Sweet," Feb. 2003.

Symbian, MMS Message Format, downloaded from World Wide Web at http://www.symbian.com/developer/techlib/v70sdocs/doc_source/devguides/cpp/Messaging/MMS/format.html on Dec. 10, 2008.

* cited by examiner

: 
SYSTEM AND METHOD FOR SWITCHING FROM A FIRST RADIO LINK TO A SECOND RADIO LINK FOR SENDING OR RECEIVING A MESSAGE VIA THE SECOND RADIO LINK

BACKGROUND

Many people use wireless communication devices, such as cell phones and personal digital assistants (PDAs), to communicate with radio access networks (RANs). These wireless communication devices and networks typically communicate with each other over a radio frequency (RF) air interface (or radio link) according to a wireless protocol such as Code Division Multiple Access (CDMA), perhaps in conformance with one or more industry specifications such as IS-2000. Wireless networks that operate according to the IS-2000 specification are often referred to as "1xRTT networks," which stands for "Single Carrier Radio Transmission Technology networks." Another protocol that may be used is a Time Division Multiple Access (TDMA) protocol known as Evolution Data Optimized (Ev-DO), perhaps in conformance with one or more industry specifications such as IS-856, Revision 0 and IS-856, Revision A. Other protocols may be used as well, such as Global System for Mobile Communications (GSM), Worldwide Interoperability for Microwave Access (WiMAX), perhaps in conformance with Institute of Electrical and Electronic Engineers (IEEE) standard 802.16, and/or any others.

These networks typically provide services such as voice, Short Message Service (SMS) messaging, and packet-data communication, among others, and typically include a plurality of base stations, each of which provide one or more coverage areas, such as cells and sectors (i.e., individual areas of a cell that allow the cell to carry more calls). When a wireless communication device is positioned in one of these coverage areas, it can communicate over the radio link with the base station, and in turn over one or more circuit-switched and/or packet-switched signaling and/or transport networks to which the base station provides access.

Wireless communication devices and base stations may conduct communication sessions (e.g. voice calls and data sessions) over a pair of frequencies known as carriers, with the base station transmitting to the wireless communication device on one of the frequencies, and the wireless communication device transmitting to the base station on the other. This is known as frequency division duplex (FDD). The base-station-to-wireless-communication-device link is known as the forward link, whereas the wireless-communication-device-to-base-station link is known as the reverse link.

Furthermore, using a sector as an example of a coverage area, base stations may provide service in a given sector on one carrier, or on more than one. An instance of a particular carrier in a particular sector is referred to herein as a sector/carrier. In a typical CDMA system, using a configuration known as radio configuration 3 (RC3), a base station can, on a given sector/carrier, transmit forward-link data on a maximum of 64 distinct channels at any time, each corresponding to a unique 64-bit code known as a Walsh code. Of these channels, typically, 61 of them are available as traffic channels (for bearer traffic, for example user data), while the other 3 are reserved for administrative channels known as the pilot, paging, and sync channels.

When a base station instructs a wireless communication device assigned to a given sector/carrier to use a particular traffic channel for a communication session, the base station does so by instructing the wireless communication device to tune to one of the 61 traffic channels on that sector/carrier. It is over that assigned traffic channel that the base station will transmit forward-link data to the wireless communication device during the ensuing communication session. And, in addition to that forward-link channel, the traffic channel also includes a corresponding Walsh-coded reverse-link channel, over which the wireless communication device will transmit data to the base station.

During various network operating conditions, such as during an overload condition in which an above-average number of users are communicating via the network and/or are attempting to communicate via the network, a given channel of the base station (for example, a paging channel) may become overloaded. To overcome the overload condition, the base station may shed certain types of messages available for sending over the given channel such that the shed messages are not communicated during the overload condition. Shedding the messages may result in overcoming the overload condition. However, shedding the messages may reduce network performance because the network may not transmit the shed messages.

OVERVIEW

A base station of a radio access network (RAN) may maintain a queue for messages to be transmitted via the RAN, and in particular, via the base station. Under various operating conditions, the base station and/or the RAN may shed (e.g., delete) messages contained in the message queue. In this way, the base station and/or the RAN may improve certain aspects of the service provided by the base station and/or the RAN, while degrading other aspects of the service provided by the base station and/or the RAN. As an example, if the base station sheds a given type of paging message while the base station (in particular the paging channel) is experiencing an overload condition, the base station's ability to transmit another type of paging message may be improved because the message queue has capacity for the other type of paging message. However, by shedding the given type of paging message, the base station may also degrade its service because it does not transmit the given type of message during the overload condition.

In one respect, an exemplary embodiment may be arranged in the form of a method carried out by a RAN serving a wireless communication device via a first protocol radio link. The first protocol radio link defines a paging channel for transmitting messages of a first type and messages of a second type. The method is executable for transmitting a message of the second type to the wireless communication device via a second protocol radio link rather than transmitting the message of the second type via the first protocol radio link. The method comprises the RAN transmitting a message of the first type to the wireless communication device, and after transmitting the message of the first type to the wireless communication device, the RAN transmitting the message of the second type to the wireless communication device via the second protocol radio link. The message of the first type may be encoded to cause the wireless communication device to switch to operate on the second protocol radio link and to switch back to operate on the first protocol radio link upon receipt of the message of the second type. In this way, after the wireless communication device receives the message of the second type, the wireless communication device switches back to operate on the first protocol radio link.

In another respect, an exemplary embodiment may be arranged as a RAN that serves a wireless communication device via a first protocol radio link. The first protocol radio link defines a paging channel for transmission of messages of a first type and messages of a second type. The RAN is operable to transmit a message of the second type to the wireless communication device via a second protocol radio link rather than to transmit the message of the second type via the first protocol radio link. The RAN comprises a processor, a transmitter operable to transmit to the wireless communication device a message of the first type via the first protocol radio link, and a data storage device that contains program instructions. The message of the first type is encoded to cause the wireless communication device to switch to operate on the second protocol radio link and to switch back to operate on the first protocol radio link upon receipt of the message of the second type. The program instructions are executable by the processor to cause the transmitter to transmit to the wireless communication device a message of the second type via the second protocol radio link. The processor executes the program instructions after the transmitter transmits the message of the first type.

In yet another respect, an exemplary embodiment may be arranged as a method carried out by a wireless communication device while the wireless communication device is being served by a RAN via a first protocol radio link. The first protocol radio link defines a paging channel for transmitting messages of a first type and messages of a second type. The method is executable for receiving from the RAN a message of the second type via a second protocol radio link rather than receiving the message of the second type via the first protocol radio link. The method comprises: (i) the wireless communication device receiving from the RAN a message of the first type, (ii) after the wireless communication device receives the message of the first type, the wireless communication device switching to operate on the second protocol radio link and thereafter the wireless communication device receiving via the second protocol radio link the message of the second type, and (iii) after the wireless communication device receives the message of the second type, the wireless communication device switching back to operate on the first protocol radio link. The message of the first type is encoded to cause the wireless communication device to switch to operate on the second protocol radio link and to switch back to operate on the first protocol radio link upon receipt of the message of the second type.

In still yet another respect, an exemplary embodiment may be arranged as a wireless communication device that is operable to be served by a RAN via a first protocol radio link and via a second protocol radio link. The first protocol radio link defines a paging channel for transmission of messages of a first type and messages of a second type. The wireless communication device is operable to receive from the RAN a message of the second type via the second protocol radio link rather than via the first protocol radio link. The wireless communication device comprises a processor, a RAN interface that is operable to receive from the RAN a message of the first type via the first protocol radio link and a message of the second type via the second protocol radio link, and a data storage device that contains first program instructions and second program instructions. While the wireless communication device is being served by the RAN via the first protocol radio link, the RAN interface is operable to receive from the RAN the message of the first type. The message of the first type is encoded to cause the processor to execute the first program instructions so as to cause the wireless communication device to switch to operation on the second protocol radio link, and to cause the processor to execute the second program instructions after receipt of the message of the second type. While the wireless communication device operates on the second protocol radio link, the RAN interface receives from the RAN the message of the second type via the second protocol radio link, and thereafter the processor executes the second program instructions so as to cause the wireless communication device to switch back to operate on the first protocol radio link.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

The following description describes various exemplary embodiments including embodiments directed to a radio access network (RAN) that is operable to: (i) serve a wireless communication device (WCD) via a first protocol radio link and via a second protocol radio link, (ii) transmit to the WCD a message of a first type via the first protocol radio link, and (iii) transmit a message of a second type via the second protocol radio link instead of via the first protocol radio link even though the message of the second type becomes available for sending to the WCD while the RAN is serving the WCD via the first protocol radio link. The RAN transmits the message of the first type to the WCD while serving the WCD via the first protocol radio link. The message of the first type may be encoded to cause the WCD to switch to operate on the second protocol radio link and to switch back to operate on the first protocol radio link upon the WCD receiving the message of the second type. The RAN may transmit the message of the second type via the second protocol radio link after the RAN transmits the message of the first type and after the WCD switches to operate on the second protocol radio link.

2. Exemplary Network Architecture

Figure 1:
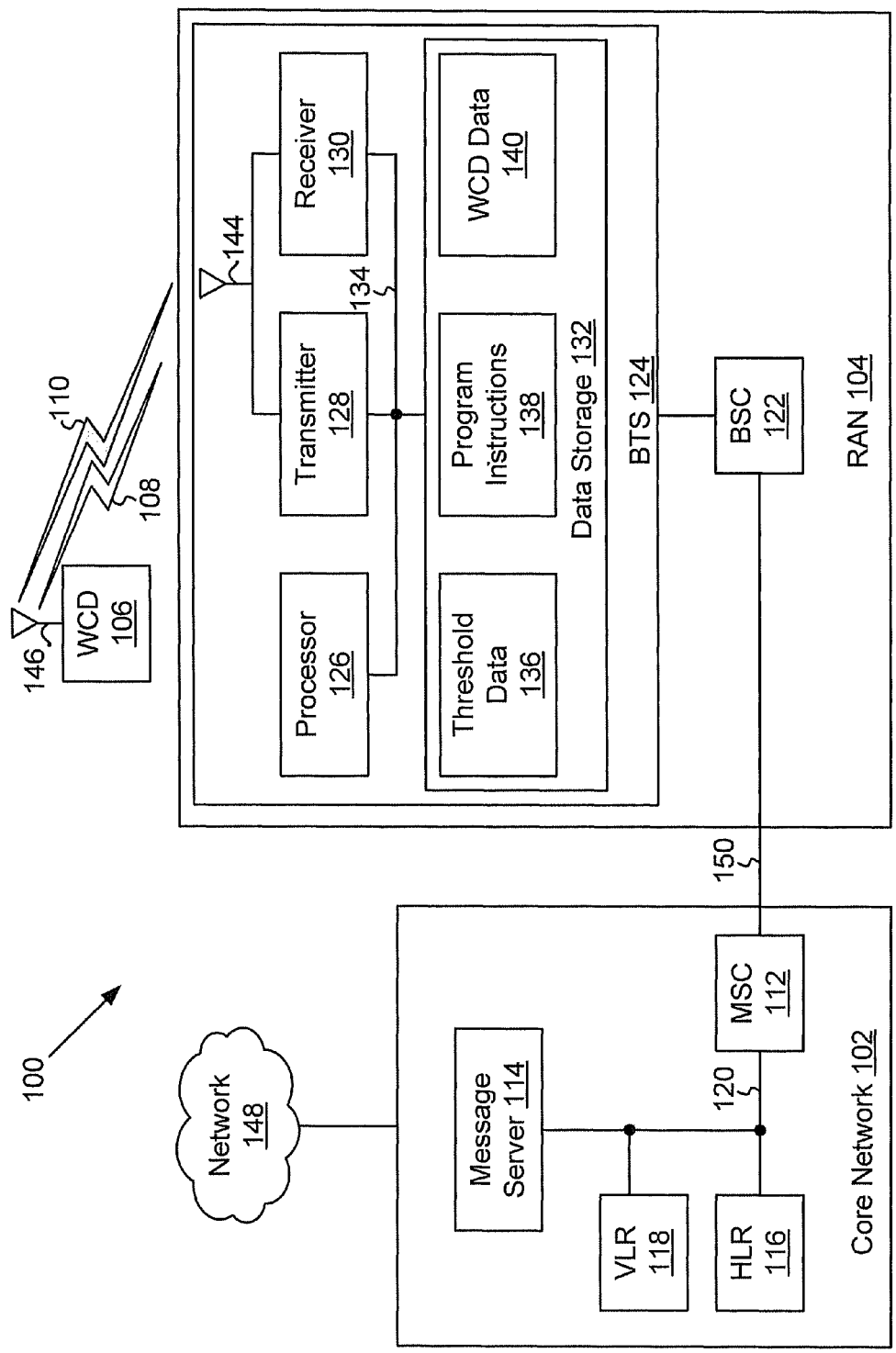
FIG. 1 is a block diagram of a network arrangement in which an exemplary embodiment may be carried out.

FIG. 1 is a block diagram of a network arrangement 100 in which various exemplary embodiments may be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As illustrated in FIG. 1, network arrangement 100 includes a core network 102, a RAN 104, a WCD 106, and a network 148. A variety of communications may be carried out between core network 102 and RAN 104, between core network 102 and network 148, and between RAN 104 and WCD 106. A given service provider may operate core network 102 and RAN 104. A given subscriber of the given service provider may operate WCD 106.

Network 148 may comprise one or more networks, such as a transport network that carries bearer traffic for a communication session carried out by WCD 106 and at least one other communication device, and/or a signaling network that carries out-of-band signals for setting up, maintaining, and/or ending the communication session. As an example, network 148 may comprise a public switched telephone network (PSTN), a signaling system 7 (SS7) network, and/or the Internet. Other examples of network 148 are also possible.

Core network 102 may include a mobile switching center (MSC) 112, a message server 114, a home location register (HLR) 116, and a visitor location register (VLR) 118, all of which may be linked together via a system bus, network, or other connection mechanism 120. MSC 112 may comprise a switch that switches communications between network 148 and a base station controller (BSC) 122 within RAN 104.

HLR 116 is a database that contains data associated with the subscribers of the given service provider. The data contained within HLR 116 may be accessed by other elements of core network 102 and/or by various elements of RAN 104 (such as any of the elements of RAN 104 shown in FIG. 1). The data associated with a particular subscriber, such as a subscriber that operates a given WCD, may include data associated with the given WCD. As an example, the data associated with WCD 106 may include a mobile identification number (MIN), a unicast access terminal identifier (UATI), a mobile station identifier (MSID), an electronic serial number (ESN), a media access control (MAC) identifier, and/or some other identifier that uniquely identifies WCD 106. As another example, the data associated with WCD 106 may include data that indicates whether WCD 106 is operable via a first protocol radio link 108 and/or via a second protocol radio link 110. Other examples of data that is associated with WCD 106 and that is contained within HLR 116 are also possible.

VLR 118 is a database containing a subset of the data stored in an HLR (for example, HLR 116) for each subscriber whose WCD is operating via an MSC (for example, MSC 112) of core network 102. VLR 118 may maintain the data for each subscriber while that subscriber is operating via an MSC of core network 102. The data contained within VLR 118 may be accessed by other elements of core network 102 and/or by various elements of RAN 104 (such as any of the elements of RAN 104 shown in FIG. 1).

Message server 114 may comprise a server that is operable to receive and thereafter maintain a message that is destined for a given subscriber (e.g., a destination subscriber) of the given service provider. Those having ordinary skill in the art will understand that message server 114 may receive and maintain multiple messages for one or more subscribers. Message server 114 may request BTS 124 to transmit each received message to a communication device (for example, WCD 106) that is associated with a destination subscriber for that message. In one respect, message server 114 may be operable to receive, maintain, and transmit only one type of message for the destination subscribers. In another respect, message server 114 may be operable to receive, maintain, and transmit multiple types of messages for the destination subscribers.

The type or types of messages that may be received, maintained, and transmitted by message server 114 may include but is not limited to short messaging service (SMS) messages, enhanced messaging system (EMS) messages, multimedia messaging service (MMS) messages, messaging waiting indicator (MWI) messages, location based service (LBS) messages, and over-the-air-provisioning (OTAP) messages. SMS messages may comprise a text message. EMS messages may comprise a text message and some other elements such as a ring tone or a graphical image. MMS messages may comprise a text message and an image. MWI messages may comprise data that indicates an e-mail message, a voice mail message, or another type of message is available for downloading to WCD 106. LBS messages may comprise an advertisement based on a geographic location of WCD 106, and OTAP messages may comprise data for reprogramming WCD 106. Other examples of each of these messages are also possible.

In an alternative arrangement, message server 114 may comprise multiple servers. In this alternative arrangement, each of the multiple servers may receive, maintain, and transmit a respective type of message or multiple types of messages.

Core network 102 may connect to RAN 104 via a communications link 150. Communications link 150 may include a wireless communications link. As an example, the wireless communications link may include a communications link that operates as a microwave communications link. Additionally or alternatively, communications link 150 may include a wireline communications link. As an example, the wireline communications link may include one or more digital signal 0 (DS0) lines, T1 lines, fiber optic lines, coaxial cables, or some other wireline communication link.

RAN 104 may include BSC 122 and a base transceiver station (BTS) 124. BSC 122 manages BTS 124. Those having ordinary skill in the art will understand that BSC 122 may manage one or more other base transceiver stations and that RAN 104 may include one or more other base station controllers that manage one or more base transceiver stations.

BTS 124 includes a processor 126, a transmitter 128, a receiver 130, and a data storage device 132, all of which may be linked together via a system bus, network, or other connection mechanism 134. RAN 104 may carry out communications with WCD 106 via the first protocol radio link 108 and/or the second protocol radio link 110. Those skilled in the art will understand that RAN 104 may carry out communications with one or more other wireless communication devices (not shown) via radio links 108, 110 and/or via one or more other protocol radio links (not shown).

First protocol radio link 108 may define a plurality of channels in accordance with a first air interface protocol. As an example, the first air interface protocol may be the CDMA protocol in accordance with the IS-2000 industry specification or another air interface protocol. Some of the channels defined by radio link 108 are for the forward link, whereas other channels defined by radio link 108 are for the reverse link. As an example, radio link 108 may define a given channel (for example, a paging channel) for transmitting messages of a first type and messages of a second type via the forward link of radio link 108. Other exemplary channels that may be defined by radio link 108 are also possible.

Second protocol radio link 110 may define a plurality of channels in accordance with a second air interface protocol. As an example, the second air interface protocol may be the Evolution Data Optimized (EvDO) protocol, perhaps in conformation with the IS-856 industry specification, Revision 0 and Revision A, or another air interface protocol that is different than the first air interface protocol. Some of the channels defined by radio link 110 are for the forward link, whereas other channels defined by radio link 110 are for the reverse link. A forward link channel of radio link 110 may include a paging channel that is operable to transmit messages of the second type.

Processor 126 may comprise one or more general purpose processors (e.g., INTEL microprocessors) and/or one or more special purpose processors (e.g., digital signal processors). Processor 126 may execute computer-readable program instructions 138 so as to carry out various functions described in this description and/or to cause transmitter 128 and/or data storage device 132 to carry out various functions described in this description.

Transmitter 128 connects to an antenna 144. Transmitter 128 is operable to transmit RF signals via antenna 144 for transmission, in turn, to WCD 106 and/or one or more other wireless communication devices via the forward link of radio link 108 or the forward link of radio link 110. The transmitted RF signals may comprise any of a variety of messages including, but not limited to, messages of the first type and messages of the second type. Antenna 144 may include one or more antennas for transmitting the forward link RF signals.

In one respect, transmitter 128 may include a single transmitter that transmits RF signals for the forward link of radio links 108, 110. In another respect, transmitter 128 may include multiple transmitters, such as a first transmitter that transmits RF signals for the forward link of radio link 108 and a second transmitter that transmits RF signals for the forward link of radio link 110. The transmission of RF signals via the forward links of radio links 108, 110 form multiple cells and/or sectors within which WCD 106 and the one or more other WCDs may operate.

Receiver 130 is operable to receive RF signals from WCD 106 and/or one or more other wireless communication devices. The RF signals received from these multiple WCDs are received via the reverse-link portion of radio links 108, 110. Receiver 130 connects to antenna 144, which may include one or more antennas for receiving the reverse-link RF signals. Receiver 130 may include a single receiver to receive RF signals transmitted via radio link 108 and RF signals transmitted via radio link 110. Alternatively, receiver 130 may include multiple receivers, such as a first receiver to receiver the RF signals transmitted via radio link 108 and a second receiver to receive the RF signals transmitted via radio link 110. Upon receiving the RF signals, receiver 130 and/or BTS 124 may transmit the received RF signals to BSC 122 for transmission, in turn, to core network 102 and/or network 148.

Data storage device 132 comprises a computer-readable storage medium readable by processor 126. The computer-readable storage medium may comprise volatile and/or non-volatile storage components, such as optical, magnetic, organic or other memory or disc storage, which can be integrated in whole or in part with processor 126. Data storage device 132 may contain threshold data 136, program instructions 138, WCD data 140, and other computer-readable data. Threshold data 136 may contain data that processor 126 can use to determine whether radio link 108 and/or a given channel of radio link 108 is overloaded. As an example, threshold data 136 may be a percentage, a given number of data bytes, or a message quantity that may be maintained in a message queue. WCD data 140 may contain data that is retrieved from HLR 116 or VLR 118. Transmitter 128 and/or processor 126 may use WCD data 140 to generate messages to be transmitted to WCD 106.

Program instructions 138 may include instructions that cause processor 126 to determine a given level of communications occurring via radio link 108 or radio link 110. As an example, the given level of communications may be the level of communications occurring via the given channel (e.g., the paging channel) of radio link 108. Processor 126 may, for example, determine this given level of communications by determining how much of a message buffer for the given channel is being used or is available for loading additional messages. Program instructions 138 may include instructions that cause processor 126 to determine whether the given level of communications exceeds threshold data 136.

Program instructions 138 may also include instructions that cause processor 126 and/or transmitter 128 to generate messages of the first type and messages of the second type and to cause transmitter 128 to transmit each of these messages via one of radio links 108, 110. The program instructions that cause transmitter 128 to transmit a given message of the second type may be executed after transmitter 128 transmits a message of the first type so as to cause WCD 106 to switch to operate on radio link 110 instead of on radio link 108.

Figure 4:
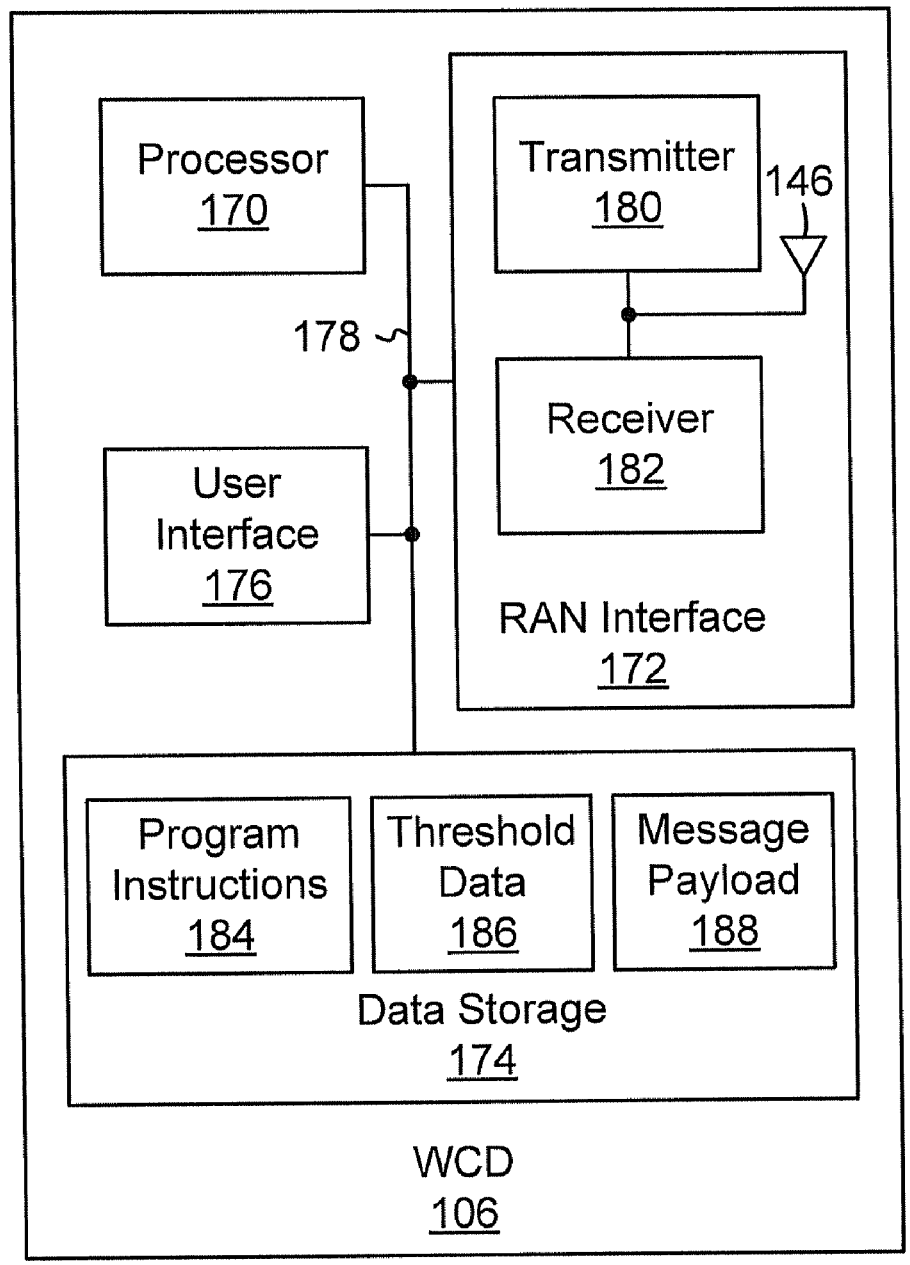
FIG. 4 is a block diagram of an exemplary wireless communication device.

WCD 106 may comprise any of a variety of devices that are operable to be served by radio links 108, 110. As an example, WCD 106 may comprise a mobile WCD, such as a cellular phone, a personal digital assistant (PDA), or a laptop computer. As another example, WCD 106 may comprise a fixed WCD, such as a wireless local loop hub. WCD 106 is operable to transmit messages to RAN 104 and to receive messages from RAN 104 via radio links 108, 110. The received messages may include messages of the first type and messages of the second type. Details of WCD 106 are illustrated in FIG. 4.

2. Exemplary Messages a. Messages of the First Type

In general, each message of the first type may be arranged for transmission via a given protocol radio link, such as radio link 108 or radio link 110. In particular, each message of the first type may be arranged for transmission via a given channel of the given protocol radio link, such as a paging channel of radio link 108. Those having ordinary skill in the art will understand how to arrange the messages of the first type for transmission via the given protocol radio link and/or given channel.

Figure 2:
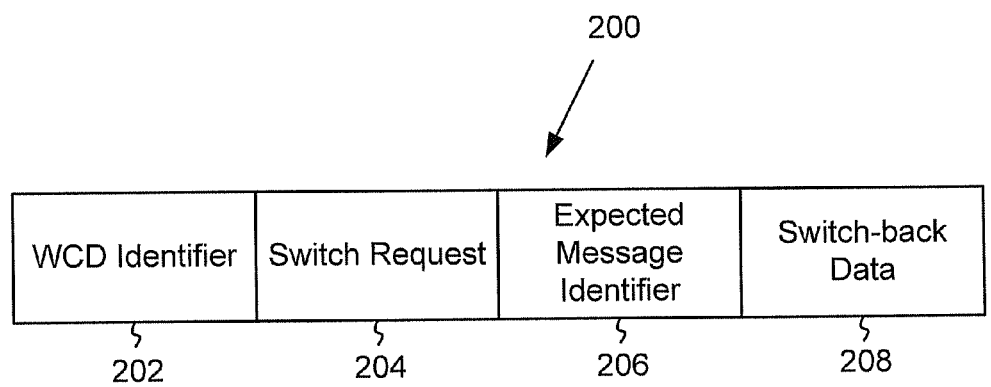
FIG. 2 illustrates an exemplary message of the first type.

FIG. 2 illustrates an exemplary message of the first type 200. Message 200 includes a WCD identifier 202, a switch request 204, an expected message identifier 206, and switch-back data 208. WCD identifier 202 indentifies which WCD the message 200 is directed to. As an example, WCD identifier 202 may comprise a MIN, a UATI, a MSID, a ESN, a MAC identifier, and/or some other identifier that uniquely identifies the WCD (for example, WCD 106) to which message 200 is directed. WCD identifier 202 may be obtained from WCD data 140.

Switch request 204 may comprise data that indicates a radio link (for example, radio link 110) that WCD 106 should switch to and operate on. As an example, switch request 204 may include a channel identifier assigned to radio link 110 and/or a frequency identifier that identifies the frequency at which radio link 110 is operating. In accordance with this embodiment, after receiving switch request 204, WCD 106 can execute program instructions that cause WCD 106 to begin operating on radio link 110.

Expected message identifier 206 may comprise data that indicates the type of message RAN 104 is going to transmit to WCD 106 via radio link 110. For example, message identifier 206 may indicate RAN 104 is going to transmit to WCD 106 an SMS message, an EMS message, an MMS message, a MWI message, a LBS message, an OTAP message, or some other type of message. Additionally or alternatively, expected message identifier 206 may comprise data that indicates a quantity of messages RAN 104 is going to transmit to WCD 106 while WCD 106 is operating on radio link 110. If the indicated quantity is greater than one, then message identifier 206 may indicate the type of each message RAN 104 is going to transmit to WCD 106 via radio link 110. RAN 104 may transmit more than one type of message to WCD 106 via radio link 110.

Switch-back data 208 may comprise data that WCD 106 can use to determine when to switch back to operate on radio link 108. For example, switch-back data 208 may comprise a single data bit that can be a first value (for example, one) or a second value (for example, zero). The first value may indicate that WCD 106 should switch back to operate on radio link 108 upon receipt of the message of the second type. After switching back to operate on radio link 108, WCD 106 may transmit to RAN 104 (in particular, BTS 124) a notification message to notify RAN 104 that WCD 106 received the message of the second type. On the other hand, the second value may indicate that WCD 106 should send to RAN 104 (or in particular, BTS 124) via radio link 110 a notification message to notify RAN 104 that WCD 106 has received the message of the second type and then switch back to operate on radio link 108. Other examples of switch-back data 208 are also possible.

In an alternative embodiment, message 200 may not include expected message identifier 206 and/or switch-back data 208. In accordance with this embodiment, after WCD 106 begins operating on radio link 110 and receives from RAN 104 a message directed to WCD 106, WCD 106 may execute program instructions that cause WCD 106 to automatically and/or responsively switch back to operating on radio link 108. Other examples of a message of the first type are also possible.

b. Messages of the Second Type

In general, each message of the second type may be arranged for transmission via a given protocol radio link, such as radio link 108 or radio link 110. In particular, each message of the second type may be arranged for transmission via a given channel (for example, a paging channel) of the given protocol radio link. Those having ordinary skill in the art will understand how to arrange the messages of the second type for transmission via the given protocol radio link and/or the given channel.

In one respect, if RAN 104, BTS 124 and/or the given channel of radio link 108 is operating under a non-overload condition, then RAN 104 may transmit the messages of the second type via radio link 108. In another respect however, if RAN 104, BTS 124 and/or the given channel of radio link 108 is operating under an overload condition, then RAN 104 may transmit the messages of the second type via radio link 110.

Figure 3:
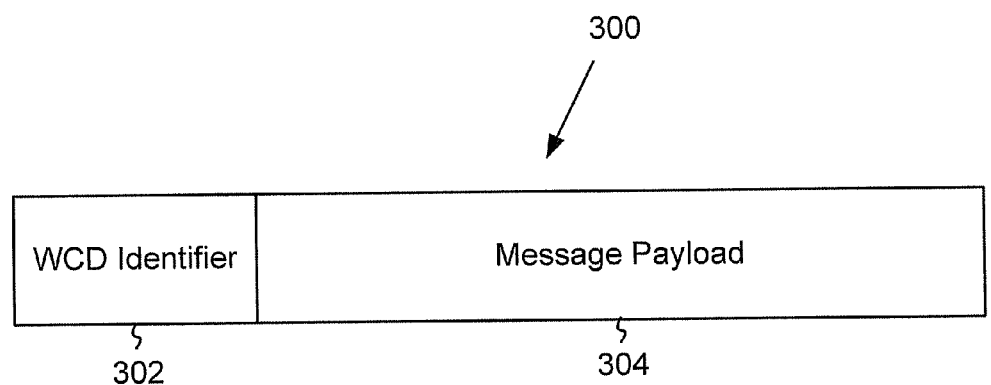
FIG. 3 illustrates an exemplary message of the second type.

FIG. 3 illustrates an exemplary message of the second type 300. Message 300 includes a WCD identifier 302 and message payload 304. WCD identifier 302 indentifies which WCD the message 300 is directed to. WCD identifier 302 may be obtained from WCD data 140. As an example, WCD identifier 302 may comprise a MIN, a UATI, a MSID, an ESN, a MAC identifier, and/or some other identifier that uniquely identifies the WCD (for example, WCD 106) to which message 300 is directed. Message payload 304 may include various types of data such as text, a ring tone, an image, and/or some other data. In particular, for example, the messages of second type may comprise an SMS message, an EMS message, an MMS message, an MWI message, an LBS message, or an OTAP message. Other exemplary arrangements of message 300 and other examples of the second type of messages are also possible.

3. Exemplary Wireless Communication Device (WCD)

Next, FIG. 4 is a block diagram of WCD 106. As illustrated in FIG. 4, WCD 106 includes a processor 170, a RAN interface 172, a data storage device 174, and a user interface 176, all of which may be linked together via a system bus, network, or other connection mechanism 178. Other wireless communication devices that are operable to carry out functions described herein and/or to communicate with RAN 104 may be arranged like WCD 106.

Processor 170 may comprise one or more general purpose processors (e.g., INTEL microprocessors) and/or one or more special purpose processors (e.g., digital signal processors). Processor 170 may execute computer-readable program instructions 184 so as to carry out various functions described in this description and/or to cause RAN interface 172, data storage device 174, user interface 176, and/or some other element (not shown) of WCD 106 to carry out various functions described in this description.

RAN interface 172 is operable as an interface to RAN 104 and/or to one or more other radio access networks (not shown). In particular, RAN interface 172 is operable to communicate with RAN 104 via radio links 108, 110. RAN interface 172 is operable to receive forward link communications, such as messages of the first type, messages of the second type, messages for establishing, maintaining, and ending a communication session, and messages of the communication session. RAN interface 172 is also operable to transmit reverse link communications, such as messages for establishing, maintaining, and ending a communication session and messages of the communication session.

In an exemplary arrangement, RAN interface 172 may include a chipset that operates according to the first protocol that defines radio link 108 and according to the second protocol that defines radio link 110. In accordance with this arrangement, the chipset may include a transmitter 180 and a receiver 182 or a transceiver that includes transmitter 180 and receiver 182. The chipset may also include and/or connect to antenna 146. Antenna 146 is operable to receive communications (for example, messages of the first type and messages of the second type) from radio links 108, 110 and to transmit other communications to radio links 108, 110.

In another exemplary arrangement, RAN interface 172 may include a first chipset that operates according to the first protocol and a second chipset that operates according to the second protocol. The first chipset may include transmitter 180 and receiver 182, whereas the second chip set includes another transmitter (not shown) and another receiver (not shown). In this exemplary arrangement, transmitter 180 and receiver 182 may connect to antenna 146, and the transmitter and receiver of the second chipset may connect to antenna 146 or to another antenna (not shown). Other exemplary arrangements of RAN interface 172 are also possible.

Data storage device 174 comprises a computer-readable storage medium readable by processor 170. The computer-readable storage medium may comprise volatile and/or non-volatile storage components, such as optical, magnetic, organic or other memory or disc storage, which can be integrated in whole or in part with processor 170. Data storage device 174 may contain program instructions 184, threshold data 186, message payload 188, and other computer-readable data. Message payload 188 may comprise data contained in message 300 and/or other messages of the second type that are received by WCD 106. Message payload 188 may also comprise messages of the first type and messages of the second type that are received by receiver 182.

Program instructions 184 may include instructions that cause WCD 106 to switch from operating on radio link 108 to radio link 110. Processor 170 may execute these program instructions in response to RAN interface 172 receiving the message of the first type and/or processor 170 detecting that RAN interface 172 has received the message of the first type.

Program instructions 184 may include instructions that cause WCD 106 to switch from operating on radio link. 110 to operating on radio link 108. Processor 170 may execute these program instructions in response to RAN interface 172 receiving the message of the second type. Alternatively, processor 170 may execute these program instructions in response to RAN interface 172 transmitting to RAN 104 a notification message to notify RAN 104 that WCD 106 has received the message of the second type. Program instructions 184 may include instructions that cause processor 170 and/or transmitter 180 to generate the notification message and to cause transmitter 180 to transmit the notification message.

Program instructions 184 may include instructions that cause processor 170 to extract the message payload 304 from message 300 and to store the extracted message payload as message payload 188. Program instructions 184 may include other instructions that cause message payload 188 or a portion of it to be presented to a user via user interface 176. As an example, message payload 188 may include the text portion of an SMS message and program instructions 184 may include instructions that cause the text portion of the SMS message to be displayed via a display of user interface 176. Other examples of program instructions 184 are also possible.

User interface 176 may comprise any of a variety of devices that allow a user to interface with WCD 106. Interfacing with the WCD 106 may include the user inputting data into WCD 106. In this regard, user interface 176 may include an input mechanism (for example, a keyboard and/or a touch screen and stylus) for receiving the data input by the user and for providing the received input data to processor 170. Interfacing with WCD 106 may also include WCD 106 presenting data to the user. In this regard, user interface 176 may include a display for presenting visual messages to the user and/or a speaker for presenting audible messages to the user. As an example, user interface 176 may present the message of the second type to a user of WCD 106. Other examples of user interface 176 and other exemplary uses of user interface 176 are also possible.

3. Exemplary Operation

Figure 5:
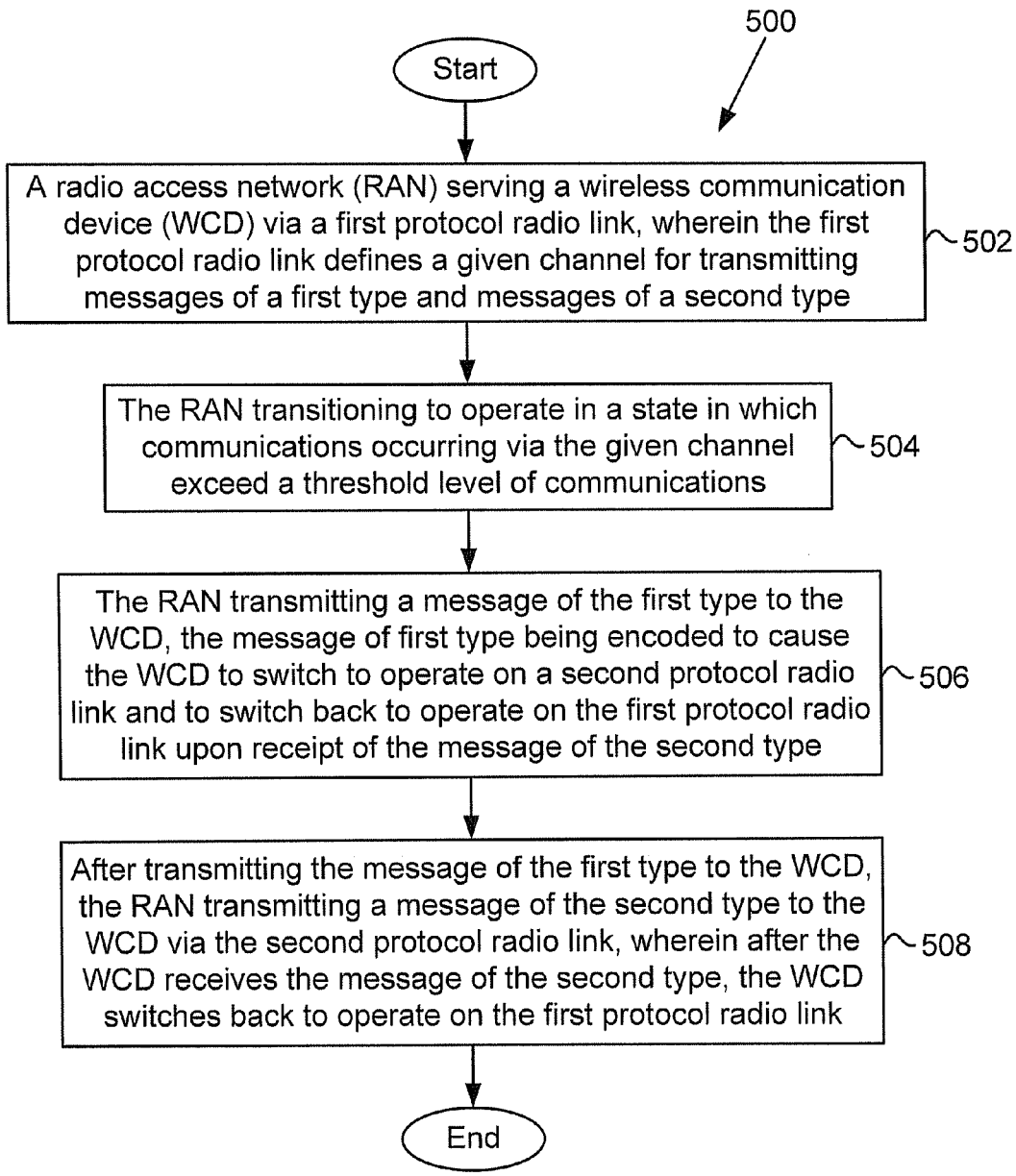
FIG. 5 is a flow chart depicting a set of functions that may be carried out in accordance with an exemplary embodiment.

Next, FIG. 5 is a flow chart provided to illustrate a set of functions 500 that may be carried out in accordance with an exemplary embodiment. In one respect, initiating performance of the set of functions 500 while RAN 104 is serving WCD 106 via radio link 108, allows for RAN 104 to transmit a message of the second type to WCD 106 via radio link 110 rather than transmitting the message of the second type via radio link 108. Transmitting the message of the second type via radio link 110 may include RAN 104 transmitting message 300 via a given channel (for example, a paging channel) defined by radio link 110.

In another respect, initiating performance of the set of functions 500 while RAN 104 is serving WCD via radio link 110, allows for RAN 104 to transmit a message of the second type to WCD via radio link 108 rather than transmitting the message of the second type via radio link 110. Transmitting the message of the second type via radio link 108 may include RAN 104 transmitting message 300 via a given channel (for example, a paging channel) defined by radio link 108.

As illustrated in FIG. 5, block 502 includes a RAN (for example, RAN 104) serving a WCD (for example, WCD 106) via a first protocol radio link (for example, radio link 108). RAN 104 may serve WCD via radio link 108 in any of a variety of ways. For example, RAN 104 may serve WCD 106 via radio link 108 by transmitting messages of the first type to WCD 106 via radio link 108 while WCD 106 is operating in an idle state. The idle state may be a state in which WCD 106 is monitoring messages transmitted by RAN 104 but is not carrying out a communication session (e.g., a voice call or a data session) with another communication device.

As another example, RAN 104 may serve WCD 106 via radio link 108 by transmitting messages of the second type to WCD 106 via radio link 108 while WCD 106 is operating in the idle state. In this regard, these messages of the second type may be transmitted to WCD 106 while the given channel used to transmit the messages via radio link 108 is not in an overloaded condition.

As yet another example, RAN 104 may serve WCD 106 via radio link 108 by transmitting pilot channel signals and/or sync channel signals to WCD 106 while WCD 106 is operating in the idle state. WCD 106 may use the pilot channel signals and/or sync channel signals to continue operating on radio link 108 in the idle state. As still yet another example, RAN 104 may serve WCD 106 via radio link 108 by transmitting to WCD 106 via radio link 108 forward link communications of a communication session that WCD 106 is engaging in. Other examples of RAN 104 serving WCD 106 via radio link 108 are also possible.

Next, block 504 includes the RAN (for example, RAN 104) transitioning to operate in an overload state in which communications occurring via the given channel (for example, a paging channel defined by radio link 108) exceed a threshold level of communications. Processor 126 may execute program instructions 138 to determine that RAN 104 is transitioning to operate and/or is operating in the overload state. In this regard, processor 126 may execute program instructions 138 that cause processor 126 to measure the communications occurring (or the communications requested to occur) via the given channel. After making the measurement, processor 126 may execute program instructions 138 that cause processor 126 to determine whether the measurement exceeds threshold data 136. If the measurement exceeds threshold data 136, then processor 126 determines that RAN 104 is operating in the overload state for the given channel. On the other hand, if the measurement does not exceed threshold data 136, then processor 126 determines that RAN is not operating in the overload state for the given channel.

Next, block 506 includes the RAN (for example, RAN 104) transmitting a message of the first type (for example, message 200) to the WCD (for example, WCD 106). The message of the first type is encoded to cause WCD 106 to switch to operate on radio link 110 and to switch back to operate on radio link 108 upon receipt of the message of the second type. RAN 104 may generate and then transmit the message of the first type (for example, message 200) in response to RAN 104 (i) receiving from message server 114 a notification message to notify RAN 104 that a message of the second type (for example, message 300) is available for transmission to WCD 106, (ii) receiving from message server 114 a request to transmit the message of the second type, and/or (iii) receiving from message server 114 the message of the second type. RAN 104 may receive this notification message, request to transmit, or the message of the second type while RAN 104 is operating in the overload state for the given channel.

Next, block 508 includes, after transmitting the message of the first type (for example, message 200) to the WCD (for example, WCD 106), the RAN (for example, RAN 104) transmitting a message of the second type (for example, message 300) to the WCD via the second protocol radio link (for example, radio link 110). Processor 126 may execute program instructions 138 to generate message 300 and to cause transmitter 128 to transmit message 300. In one respect, execution of these program instructions may cause processor 126 to wait a pre-determined amount of time (for example, five seconds) after transmission of message 200 prior to transmitting the message of the second type. In another respect, execution of these program instructions may cause processor 126 to wait until RAN 104 receives a message from WCD 106 via radio link 110 before generating message 300 and/or before causing transmitter 128 to transmit message 300. The message received from WCD 106 via radio link 110 allows RAN 104 to determine that WCD 106 is operating on radio link 110.

WCD 106 may carry out various functions after and/or in response to receiving the message of the second type. For example, after WCD 106 receives the message of the second type, WCD 106 may switch back to operate on radio link 108. After switching back to operate on radio link 108, WCD 106 may transmit to RAN 104 via radio link 108 a notification message to notify RAN 104 that WCD 106 has received the message of the second type. As another example, after WCD 106 receives the message of the second type, WCD 106 may transmit to RAN 104 via radio link 110 a notification message to notify RAN 104 that WCD 106 has received the message of the second type, and thereafter WCD 106 may switch back to operate on the radio link 108. As yet another example, after WCD 106 receives the message of the second type, processor 170 may execute program instructions 184 that cause user interface 176 to present the message of the second type to a user of WCD 106.

Additionally, while RAN 104 is serving WCD 106 via radio link 108, RAN 104 may transition to operate in a state in which communications occurring via a given channel (for example, a paging channel of radio link 108) do not exceed the threshold level of communications. While operating in this non-overload state, RAN 104 may receive from message server 114 (i) a notification message to notify RAN 104 that another message of the second type is available for transmission to WCD 106, (ii) a request to transmit the other message of the second type, and/or (iii) the other message of the second type. Thereafter, RAN 104 may transmit the other message of the second type to WCD 106 via protocol link 108.

Figure 6:
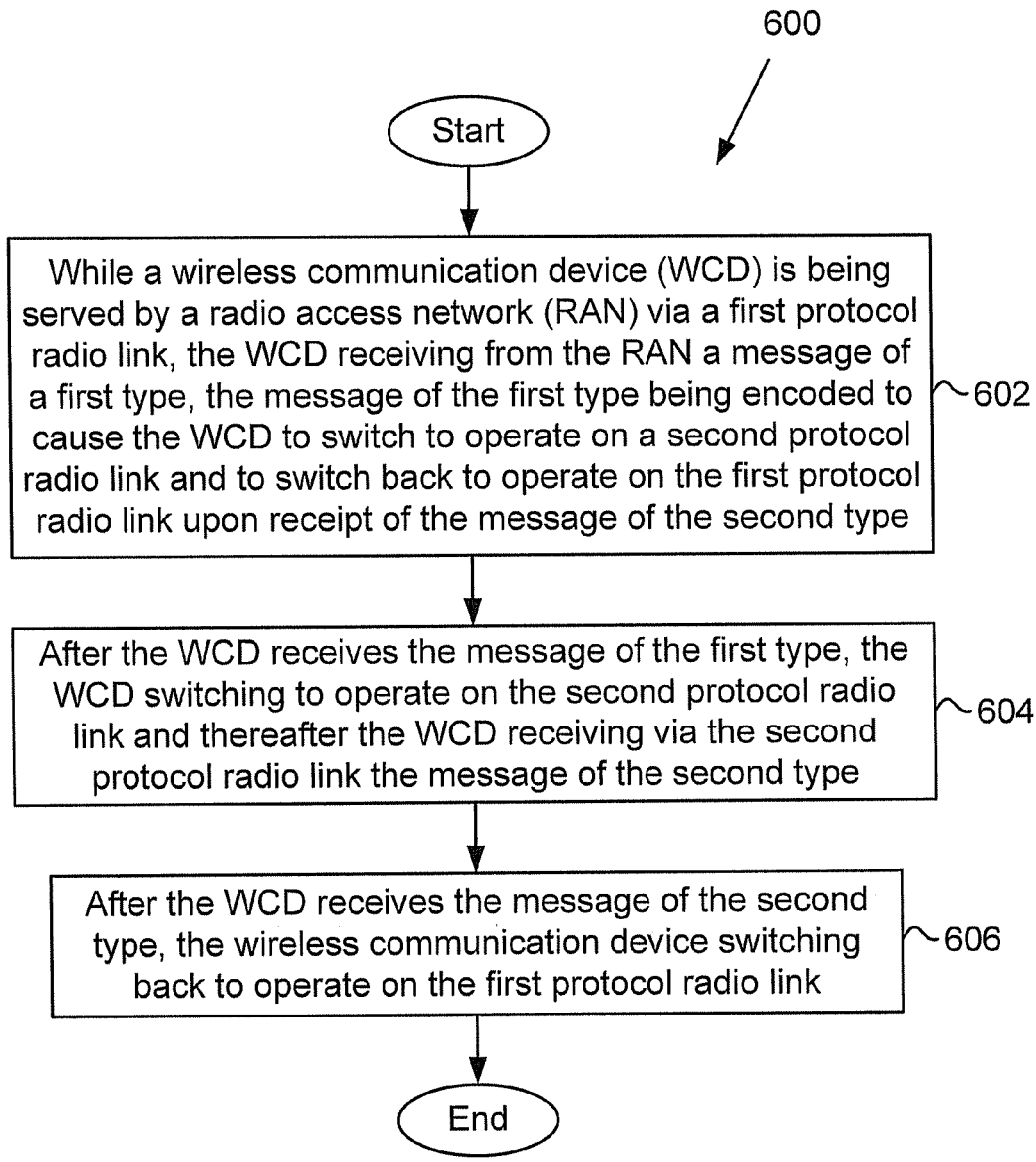
FIG. 6 is another flow chart depicting a set of functions that may be carried out in accordance with an exemplary embodiment.

Next, FIG. 6 is another flow chart provided to illustrate a set of functions 600 that may be carried out in accordance with an exemplary embodiment. The set of functions 600 may be carried out by a WCD (for example, WCD 106) being served by a RAN (for example, RAN 104) via a first protocol radio link (for example, radio link 108). Execution of the set of functions 600 allows the WCD 106 to receive from RAN 104 a message of the second type via a second protocol radio link (for example, protocol radio link 110) rather than receiving the message of the second type via protocol radio link 108.

Block 602 includes, while a WCD is being served by a RAN via a first protocol radio link, the WCD receiving from the RAN a message of the first type. The message of the first type may be encoded to cause WCD 106 to switch to operate on a second protocol radio link (for example, radio link 110) and to switch back to operate on the first protocol radio link (for example, radio link 108) upon receipt of the message of the second type. The message of the first type may be arranged as message 200.

Next, block 604 includes, after the WCD receives the message of the first type, the WCD switching to operate on the second protocol radio link and thereafter the WCD receiving via the second protocol radio link the message of the second type. The message of the second type may be arranged as message 300. In this regard, the message of the second type may comprise a SMS message, an EMS message, a MMS message, a MWI message, a LBS message, or an OTAP message. Other examples of the second type of message that WCD 106 receives via radio link 110 are also possible.

In accordance with an exemplary embodiment, in response to WCD 106, or in particular receiver 182, receiving the message of the first type via radio link 108, processor 170 may execute program instructions 184 so as to cause WCD 106 to switch from operating on radio link 108 to operating on radio link 110. In this way, receiver 182 is able to receive the message of the second type via radio link 110.

In accordance with another exemplary embodiment, in response to WCD 106, or in particular receiver 182, receiving the message of the first type via radio link 108, processor 170 may execute program instructions 184 so as to cause transmitter 180 to transmit to RAN 104 via radio link 110 a notification message to notify RAN 104 that WCD 106 is operating on radio link 110. This notification message may be any message that WCD 106 can send and that RAN 104 can receive via radio link 110. RAN 104 may transmit the message of the second type in response to receiving this notification message via radio link 110.

Next, block 606 includes, after the WCD receives the message of the second type, the WCD switching back to operate on the first protocol radio link. WCD 106 may carry out other functions as well in response to receiving the message of the second type. For example, after WCD 106 receives the message of the second type, WCD 106 may switch back to operate on radio link 108, and after switching back to operate on radio link 108, WCD 106 may transmit to RAN 104 via radio link 108 a notification message to notify RAN 104 that WCD 106 has received the message of the second type.

As another example, after WCD 106 receives the message of the second type, WCD 106 may transmit to RAN 104 via radio link 110 a notification message to notify RAN 104 that WCD 106 has received the message of the second type, and thereafter WCD 106 may switch back to operate on the radio link 108. As yet another example, after WCD 106 receives the message of the second type, processor 170 may execute program instructions 184 that cause user interface 176 to present the message of the second type to a user of WCD 106.

Additionally, while RAN 104 is serving WCD 106 via radio link 108, RAN 104 may transition to operate in a state in which communications occurring via a given channel (for example, a paging channel of radio link 108) do not exceed the threshold level of communications. While operating in this non-overload state, RAN 104 may receive from message server 114 (i) a notification message to notify RAN 104 that another message of the second type is available for transmission to WCD 106, (ii) a request to transmit the other message of the second type, and/or (iii) the other message of the second type. Thereafter, RAN 104 may transmit the other message of the second type to WCD 106 via protocol link 108.

4. Conclusion

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:

transmitting, using a base transceiver station (BTS) of a radio access network (RAN) that is serving a wireless communication device via a first protocol radio link, a message of a first type to the wireless communication device via the first protocol radio link, wherein the message of the first type is encoded with data to cause the wireless communication device to switch from the first protocol radio link to a second protocol radio link, and to switch from the second protocol radio link to the first protocol radio link upon receiving a message of a second type from the BTS via the second protocol radio link; and transmitting, using the BTS, the message of the second type to the wireless communication device via the second protocol radio link so as to cause the wireless communication device to switch from the second protocol radio link to the first protocol radio link based on the data encoded within the message of the first type, wherein transmitting the message of the second type occurs after transmitting the message of the first type and while the RAN is serving the wireless communication device via the second protocol radio link.

2. The method of claim 1, further comprising:

transitioning, the RAN, to operate in a first state in which communications occurring via a paging channel of the first protocol radio link exceed a threshold level of communications, wherein transmitting the message of the first type to the wireless communication device occurs in response to receiving, using the RAN while operating in the first state, a request to transmit the message of the second type to the wireless communication device.

3. The method of claim 2, further comprising:

transitioning, while the RAN is operating in the first state, the RAN to operate in a second state in which communications occurring via the paging channel do not exceed the threshold level of communications; and receiving, using the RAN while the RAN is operating in the second state, a request to transmit another message of the second type to the wireless communication device and the RAN transmitting the other message of the second type to the wireless communication device via the first protocol radio link.

4. The method of claim 1, wherein the message of the second type is selected from the group consisting of a message waiting indicator (MWI) message, a short message service (SMS) message, an enhanced messaging service (EMS) message, a location based service (LBS) message, a multimedia messaging service (MMS) message, and an over-the-air provisioning (OTAP) message.

5. The method of claim 1, further comprising:

receiving, at the RAN from the wireless communication device, a notification message to notify the RAN that the wireless communication device has received the message of the second type.

6. The method of claim 5, wherein the notification message is received at the RAN via the second protocol radio link.

7. The method of claim 6, wherein the message of the first type comprises switch-back data that indicates the wireless communication device is to transmit the notification message via the second protocol radio link before the wireless communication device switches back to operate on the first protocol radio link.

8. The method of claim 5, wherein the notification message is received at the RAN via the first protocol radio link.

9. The method of claim 1, further comprising:

before the BTS of the RAN transmits the message of the first type to the wireless communication device, the RAN receiving data to notify the RAN that the wireless communication device is operable on the first protocol radio link and the second protocol radio link.

10. A radio access network (RAN) configured to serve a wireless communication device via a first protocol radio link and a second protocol radio link, wherein the first protocol radio link defines a paging channel for transmission of messages of a first type and messages of a second type, and wherein the RAN is operable to transmit a message of the second type to the wireless communication device via the second protocol radio link rather than transmitting the message of the second type via the first protocol radio link, the RAN comprising:

a processor;

a base transceiver station (BTS) transmitter that transmits, to the wireless communication device via the first protocol radio link, a message of the first type encoded with data to cause the wireless communication device to switch from the first protocol radio link to the second protocol radio link, and to switch from the second protocol radio link to the first protocol radio link, based on the data encoded within the message of the first type, upon the wireless communication device receiving the message of the second type from the BTS transmitter via the second protocol radio link;

a data storage device that contains program instructions executable by the processor to cause the BTS transmitter to transmit to the wireless communication device a message of the second type via the second protocol radio link, wherein the processor executes the program instructions after the BTS transmitter transmits the message of the first type via the first protocol radio link.

11. The radio access network of claim 10, wherein the first protocol radio link is arranged in accordance with a code division multiple access (CDMA) standard and the second protocol radio link is arranged in accordance with a time division multiple access (TDMA) standard.

12. The radio access network of claim 10, wherein the data storage device further contains a threshold value and program instructions executable by the processor to determine whether communications occurring via the paging channel exceed the threshold value, wherein if the communications occurring via the paging channel exceed the threshold value, then the BTS transmitter transmits the messages of the second type to the wireless communication device via the second protocol radio link, and wherein if the communications occurring via the paging channel do not exceed the threshold value, then the BTS transmitter transmits the messages of the second type to the wireless communication device via the first protocol radio link.

13. A method comprising:

receiving, using a wireless communication device being served by a radio access network (RAN) via a first protocol radio link, a message of a first type transmitted by a base transceiver station (BTS) of the RAN via the first protocol radio link, wherein the message of the first type is encoded with data to cause the wireless communication device to switch from the first protocol radio link to a second protocol radio link of the RAN, and to switch from the second protocol radio link to the first protocol radio link upon receiving a message of the second type from the BTS via the second protocol radio link;

switching, after receiving the message of the first type transmitted by the BTS via the first protocol radio link, the wireless communication device from the first protocol radio link to the second protocol radio link;

receiving, using the wireless communication device while the wireless communication device operates on the second protocol radio link, the message of second type transmitted by the BTS via the second protocol radio link; and switching, after receiving the message of the second type via the second protocol radio link, the wireless communication device from the second protocol radio link to the first protocol radio link based on the data encoded within the message of the first type received using the wireless communication device.

14. The method of claim 13, further comprising:
transmitting, using the wireless communication device after receiving the message of the second type, a notification message to notify the RAN that the wireless communication device has received the message of the second type.

15. The method of claim 14, wherein transmitting the notification message occurs via the second protocol radio link.

16. The method of claim 15, wherein transmitting notification message occurs before the wireless communication device switches back to operate on the first protocol radio link.

17. The method of claim 14, wherein transmitting the notification message occurs via the first protocol radio link.

18. The method of claim 13, wherein the message of the second type is selected from the group consisting of a message waiting indicator (MWI) message, a short message service (SMS) message, an enhanced messaging system (EMS) message, a location based service (LBS) message, a multimedia messaging service (MMS) message, and an over-the-air provisioning (OTAP) message.

19. The method of claim 13, further comprising:
transmitting, using the wireless communication device and via the second protocol radio link after the wireless communication device receives the message of the first type but before the wireless communication device receives the message of the second type, a notification message that notifies the RAN that the wireless communication device is operating on the second protocol radio link.

20. The radio access network of claim 10, further comprising:

a BTS receiver that receives, from the wireless communication device after the wireless communication device has switched from the second protocol radio link to the first protocol radio link based on the data encoded within the message of the first type, a notification message that indicates the wireless communication device has switched back to operate on the first protocol radio link.

21. A wireless communication device that is operable to be served by a radio access network (RAN) via a first protocol radio link, wherein the first protocol radio link defines a paging channel for transmission of messages of a first type and messages of a second type, and wherein the wireless communication device is operable to receive from the RAN a message of the second type via a second protocol radio link rather than via the first protocol radio link, the wireless communication device comprising:

a processor;

a RAN interface to receive from a base transceiver station (BTS) of the RAN a message of the first type via the first protocol radio link and a message of the second type via the second protocol radio link; and a data storage device containing first program instructions and second program instructions, wherein, while the wireless communication device is being served by the RAN via the first protocol radio link, the RAN interface receives from the RAN the message of the first type transmitted to the RAN interface by the BTS via the first protocol radio link, wherein the message of the first type is encoded with data to (i) cause the processor to execute the first program instructions so as to cause the wireless communication device to switch from the first protocol radio link to the second protocol radio link, and (ii) cause the processor to execute the second program instructions after receipt of the message of the second type transmitted from the BTS via the second protocol radio link, and wherein, while the wireless communication device operates on the second protocol radio link, (i) the RAN interface receives from the RAN the message of the second type transmitted by the BTS via the second protocol radio link, and (ii) thereafter the processor, based on the data encoded within the message of the first type received at the RAN interface, executes the second program instructions so as to cause the wireless communication device to switch from the second protocol radio link to the first protocol radio link.

22. The wireless communication device of claim 21, further comprising:
a user interface that presents the message of the second type to a user of the wireless communication device.

* * * * *